(12) United States Patent
Walker et al.

(10) Patent No.: US 6,452,584 B1
(45) Date of Patent: *Sep. 17, 2002

(54) SYSTEM FOR DATA MANAGEMENT BASED ON HAND GESTURES

(75) Inventors: Christopher Walker, Venice, CA (US); Babak Beheshti, Santa Monica, CA (US)

(73) Assignee: Modern Cartoon, Ltd., Venice, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/466,527

(22) Filed: Dec. 17, 1999

Related U.S. Application Data

(63) Continuation-in-part of application No. 08/838,938, filed on Apr. 23, 1997, now Pat. No. 6,049,327.

(51) Int. Cl.[7] .................................................. G09G 5/08
(52) U.S. Cl. ......................................................... 345/158
(58) Field of Search ................................. 345/156, 157, 345/158; 341/20; 600/595

(56) References Cited

U.S. PATENT DOCUMENTS

| | | |
|---|---|---|
| 4,414,537 A | 11/1983 | Grimes |
| 4,988,981 A | 1/1991 | Zimmerman et al. |
| 5,097,252 A | 3/1992 | Harvill et al. |
| 5,184,319 A | 2/1993 | Kramer |
| 5,316,017 A | 5/1994 | Edwards et al. |
| 5,429,140 A | 7/1995 | Burdea et al. |
| 5,442,729 A | 8/1995 | Kramer et al. |
| 5,444,462 A | 8/1995 | Wambach |
| 5,488,362 A | 1/1996 | Ullman et al. |
| 5,533,531 A | 7/1996 | Edwards et al. |
| 5,612,689 A | 3/1997 | Lee, Jr. |
| 6,049,327 A * | 4/2000 | Walker et al. ............... 345/158 |

* cited by examiner

Primary Examiner—Steven Saras
Assistant Examiner—Amr Awad
(74) Attorney, Agent, or Firm—Cislo & Thomas LLP

(57) ABSTRACT

A system is provided for manipulating computer generated animation in real time, such as a virtual reality program running on a computer. The system includes a data glove for managing data based on an operator's hand gestures. The invented data glove comprises an elastic material that closely matches the shape of a wearer's hand, enabling the wearer to move their hand freely. A movement sensing unit is provided for sensing any hand gestures of the wearer. The movement sensing unit comprises a flexible circuit board that extends along the dorsal region of the wearer's fingers and hand. The circuit board includes a base with a signal processor for processing received signals generated by a plurality of movement sensors. The sensors transmit signals to the processor for determining any movement of the wearer's hand. The sensors have a resistive material disposed on each side thereof, so that any flexure of the sensor causes the resistance values to diverge, preferably linearly. The resistance values on each side of the sensor diverge to a value corresponding to the degree of flexure of the sensor. A reference voltage is applied to each side of the sensor for establishing a voltage differential between its two sides. Any flexure of the sensor causes the resistance value of each side to change, for changing the reference voltage level between the two sides to indicate that the sensor has been flexed and the degree of flexure.

7 Claims, 5 Drawing Sheets

SYSTEM FOR DATA MANAGEMENT BASED ON HAND GESTURES

REFERENCE TO RELATED APPLICATION

This application is a continuation-in-part of application Ser. No. 08/838,938, filed Apr. 23, 1997 now U.S. Pat. No. 6,049,327, for System For Data Management Based On Hand Gestures.

FIELD OF THE INVENTION

The present invention relates generally to data entry and manipulation devices for computers, and more particularly, to a data management system for a computer that manages data based on the hand gestures of an operator.

BACKGROUND OF THE INVENTION

Virtual reality systems are computer based systems that provide the experience of acting in a simulated environment that forms a three dimensional virtual world. These systems are used in several different applications such as commercial flight simulators and entertainment systems including computer games and video arcade games. In virtual reality systems a participant typically wears a head-mounted device that enables viewing of a virtual reality world generated by the computer. The system also includes a data entry and manipulation device, such as a pointing device or a specially configured data glove containing sensors and actuators, for interacting with objects in the virtual world. In somewhat sophisticated systems, a full body suit, also containing sensors and actuators, additionally may be provided so that the user can influence and has a realistic feel of objects in the virtual world.

Data entry and manipulation devices for computers, including virtual reality systems, include keyboards, digitizers, computer mice, joysticks, and light pens. One function of these devices, and particularly computer mice and light pens, is to position a cursor on a display screen of a monitor connected to the computer and cause the computer to perform a set of operations, such as invoking a program, which operations are indicated by the location of the cursor on the screen. Once the cursor is at the desired location, buttons on either the mouse or keyboard are depressed to perform the instruction set. However, over time this may become somewhat tedious, since the user must transfer one of their hands from the keyboard to the mouse, move the mouse cursor to the desired location on the screen, then either actuate a button on the mouse, or transfer their hand back to the keyboard and depress buttons to invoke the program.

Alternative means for data entry and manipulation into computers have been provided in the prior art. One increasingly prevalent data entry device comprises a data entry and data manipulation glove, commonly known as "data gloves" and "virtual reality gloves". Data gloves are currently used in several virtual reality related applications ranging from virtual reality entertainment and education systems to medical rehabilitation applications. In a virtual reality system, the data glove is provided to enable the operator to touch and feel objects on a virtual screen and to manipulate the objects.

U.S. Pat. No. 4,988,981, to Zimmerman et al discloses an apparatus and method for generating control signals for manipulating virtual objects in a computer system according to gestures and positions of an operator's hand or other body part. The apparatus includes a glove worn on the hand which includes sensors for detecting the gestures of the hand. The computer system includes circuitry connected to receive gesture signals and hand position signals for generating control signals. The control signals are used to manipulate a graphical representation of the operator's hand which is displayed on a monitor coupled to the computer system. The graphical representations of the operator's hand manipulates virtual objects or tools also displayed by the computer.

U.S. Pat. No. 5,097,252, to Harvill et al., discloses a motion sensor which produces an asymmetrical signal in response to symmetrical movement. In a first embodiment, a plurality of motion sensors are placed over the joints of a hand, with each sensor comprising an optical fiber disposed between a light source and a light sensor. An upper portion of the fiber is treated so that transmission loss of light being communicated through the optical fiber is increased only when the fiber bends in one direction. In another Harvill embodiment, a flexible tube is disposed in close proximity to a finger joint and bends in response to bending of the finger. A light source and light sensor on opposite ends of the tube continuously indicate the extent that the tube is bent.

U.S. Pat. No. 5,429,140, to Burdea et al., is directed to an integrated virtual reality rehabilitation system that employs a force feedback system, such as a force feedback glove to simulate virtual deformable objects. A patient places his or her hand in a sensing glove that measures the force exerted by the patient. Information from the sensing glove is received by an interface and transmitted to a computer where the information can be used to diagnose the patient's manual capability.

The computer then generates rehabilitation control signals for the force feedback glove. The patient places his or her hand in the force feedback glove and attempts to bring the digits together as though grasping the virtual object. The force feedback glove resists the squeezing movement of the digits in a manner that simulates the tactile feel of the virtual object. The force exerted by the fingers of the patient is fed back to the computer control system, where it can be recorded or used to modify rehabilitation control signals.

U.S. Pat. No. 5,612,689, to Lee Jr., discloses a finger articulation controlled information generating system. The Lee system includes a plurality of finger articulation units that individually mount on finger and thumb nails and together, by selected up and down movement of the finger and thumbs, serve as an alternate to a keyboard or other computer interface. Vertical up and down movements of any single one of the ten fingers and various combinations of the fingers is translated into a range of signals recognizable as alpha-numeric numbers, digital signaling, word and picture forms, or other symbol forms a user may choose.

However, a disadvantage common to the above noted data gloves is that the gloves are substantially difficult and expensive to manufacture. Difficulty of manufacture is due to the plurality of discrete movement monitoring devices provided with the glove for sensing the hand gestures of the wearer. These devices include light emitting sources and appropriate sensing devices. complex circuitry is needed for the light emitters and coupled sensors and to generate movement indicating control signals.

A further disadvantage of these data gloves is that the movement monitoring devices have poor longevity and are prone to reliability problems. Another disadvantage of these movement monitoring devices is that they may not sufficiently track the hand gestures of the wearer. The sensors may generate signals that are not an accurate representation of the wearer's hand gestures causing erroneous data to be generated. Furthermore, the plurality of sensors located about on the periphery of the gloves, and particularly on the wearer's joints, may substantially inhibit the wearer from moving their hand freely.

Computer generated animation is programmed within the computer to form a cartoon or other animation prior to the animation being run for display. This is similar to a draftsman drawing cells in a cartoon strip. A disadvantage is that it is not possible for a person to have interaction with the computer animation while the animation is being developed or displayed. It would be advantageous to provide a system for interacting with computer animation in "real time"; i.e., wherein a person can interact with the animation while the animation is running.

Thus, there exists a need for a system for manipulating computer generated animation in real time that includes a data management device for a computer which manages data based on hand gestures of an operator.

OBJECTS OF THE INVENTION

It is therefore an object of the present invention to provide a system for manipulating computer generated animation time;

It is another object of the present invention to provide a system for manipulating computer generated animation in real time that includes a data management device which manages data based on the hand gestures of an operator;

It is a further object of the present invention to provide a system for manipulating computer generated animation in real time that includes a data management device which manages data based on the hand gestures of an operator that provides ease of manufacture thereof;

It is still another object of the present invention to provide a system for manipulating computer generated animation in real time which includes a data management device that manages data based on the hand gestures of an operator that accurately tracks the movements of the operator's hand;

It is yet a further object of the present invention to provide a system for manipulating computer generated animation in real time which includes a data management device that manages data based on the hand gestures of an operator that does not prevent the operator from moving their hand freely about; and It is another object of the present invention to provide a system for manipulating computer generated animation in real time that includes a data management device which manages data based on the hand gestures of an operator that can be used repeatedly without causing harm thereto.

SUMMARY OF THE INVENTION

These and other objects and advantages of the present invention are achieved by providing a system for manipulating computer generated animation, such as a virtual reality program running on a computer. The present invention operates in real time and includes a data management device which manages data based on an operator's hand gestures. The preferred embodiment of the invented data management device comprises a data glove that provides data entry into a computer and data manipulation. The data is used to manipulate objects in the virtual reality program based upon the operator's hand gestures and positioning.

The preferred embodiment of the present invention includes a glove worn on a wearer's hand, a computer for processing data control signals output from the glove, and a data cable coupling the glove to the computer for data transfer. Data generated from the control signals output from the glove is transmitted to the computer for processing in real time. The data is continuously processed so that an object in the virtual environment displayed on the computer (such as the hands of a cartoon figure or other desired object) can be manipulated in real time while the program is running.

The glove of the preferred embodiment of the present invention is made from an elastic material that closely matches the shape of a wearer's hand while still enabling the wearer to move their hand freely. The elastic material is preferably breathable for providing a glove that is comfortable for the wearer. The glove is configured with an aperture that extends over a dorsal region of the wearer's hand and along the dorsal region of each of their fingers.

A movement sensing unit comprised of sensors and integral circuitry senses any movements of the wearer's hand. The sensing unit is retained in the aperture of the data glove. Securing the sensing unit within the aperture prevents the unit from contacting the wearer and from being positioned externally on the glove, which can substantially limit the wearer's freedom of movement and may expose the unit to damage.

Unlike the prior art which utilizes separately connected sensors and circuitry, in the preferred embodiment of the present invention, the sensing unit comprises a flexible circuit board configured to extend along the dorsal region of the wearer's fingers and hand. The circuit board includes a base region and a plurality of movement sensors. The base region is provided with signal processing means for processing signals generated by the movement sensors. The processing means multiplexes the signals and then transmits the multiplexed signals to the computer via the data cable.

The movement sensors include a plurality of elongated portions of the flexible circuit board that extend outwardly from the base region. In the preferred embodiment of the present invention, a sensor is provided for sensing movement in each of the wearer's fingers and thumb. Additional sensors are also provided for sensing the web areas between the wearer's index and middle fingers, and the thumb and index finger. In the preferred embodiment, an even further sensor is provided for sensing the dorsal region of the wearer's hand between the index finger and thumb.

Each of the sensors transmits signals to the processing means so that each of the regions are simultaneously monitored for determining any movement of the wearer's hand. Any movement of the wearer's hand is then transmitted to the computer in real time for manipulating a program running on the computer.

In the preferred embodiment of the present invention, each of the sensors has a resistive material disposed on each side, with each side of the sensor having a similar initial resistance is value. Any flexure of the sensor causes the resistance values thereof to diverge in a linear manner. When the resistance value on one side of the circuit board/sensor decreases, the resistance level on the other side simultaneously increases. The resistance values on each side of the sensor diverge to a value corresponding to the degree of flexure of the sensor.

In the preferred embodiment of the present invention, a different voltage level is applied to each side of a sensor to establish a voltage differential between the two sides and an initial voltage potential on the sensor. Preferably, a negative voltage is applied to one side of the sensor and a corresponding positive voltage is applied to the other side of the sensor. Any flexure of the sensor causes the resistance value on each side thereof to change. The change in resistance corresponds to a change in the initial voltage potential on the sensor to another voltage level (i.e., the voltage potential going more positive or more negative) to indicate that the sensor has been flexed and the degree of flexure.

For example, when a wearer bends their fingers and thumb, the circuit board is flexed. The resistance value on one side of the board decreases to a value determined by the degree of flexure of the board, while the resistance level on the other side simultaneously increases to a value also determined by the degree of flexure. The resistance values of the two sides change linearly, and causes the initial voltage potential of the sensor to change to a voltage potential representative of the resistance values.

Thus, the voltage potential output by each of the sensors provides a facile system for measuring the extent that the sensors are flexed and determining the various positions of each of the sensors. Further, if the degree of flexure of any one of the sensors is maintained, the resistance values remain constant. The voltage differential also remains constant and indicates that the position of the sensor is being maintained.

The movement sensors of the data glove of the preferred embodiment continuously generate data representative of the actual positions and gestures of the wearer's hand. This allows the processing means to transmit data representative of the wearer's hand gestures to the computer.

Further, the data glove of the preferred embodiment of the present invention is provided with flexible conductors extending through the circuit board from the movement sensors to the processing means for transmitting signals therebetween. The conductors used by the preferred embodiment are well suited for repeated bending and enhance the longevity of the data glove. The conductors are preferably a balanced copper having a selected thickness that enable the conductors to be repeatedly flexed without causing excessive strain.

BRIEF DESCRIPTION OF THE DRAWINGS

The above and other features, organizations, advantages and objects of this invention will be fully understood from the following detailed description and the accompanying drawings. Each of the drawings contained herein are not considered to be specific depictions of the embodiments of the invention, but are provided for illustrative purposes only and are to be interpreted in conjunction with the attached specification.

DETAILED DESCRIPTION OF THE INVENTION

The following description is provided to enable any person skilled in the art to make and use the invention and sets forth the best modes presently contemplated by the inventors of carrying out their invention. Various modifications, however, will remain readily apparent to those skilled in the art, since the generic principles of the present invention have been defined herein.

Figure 1:
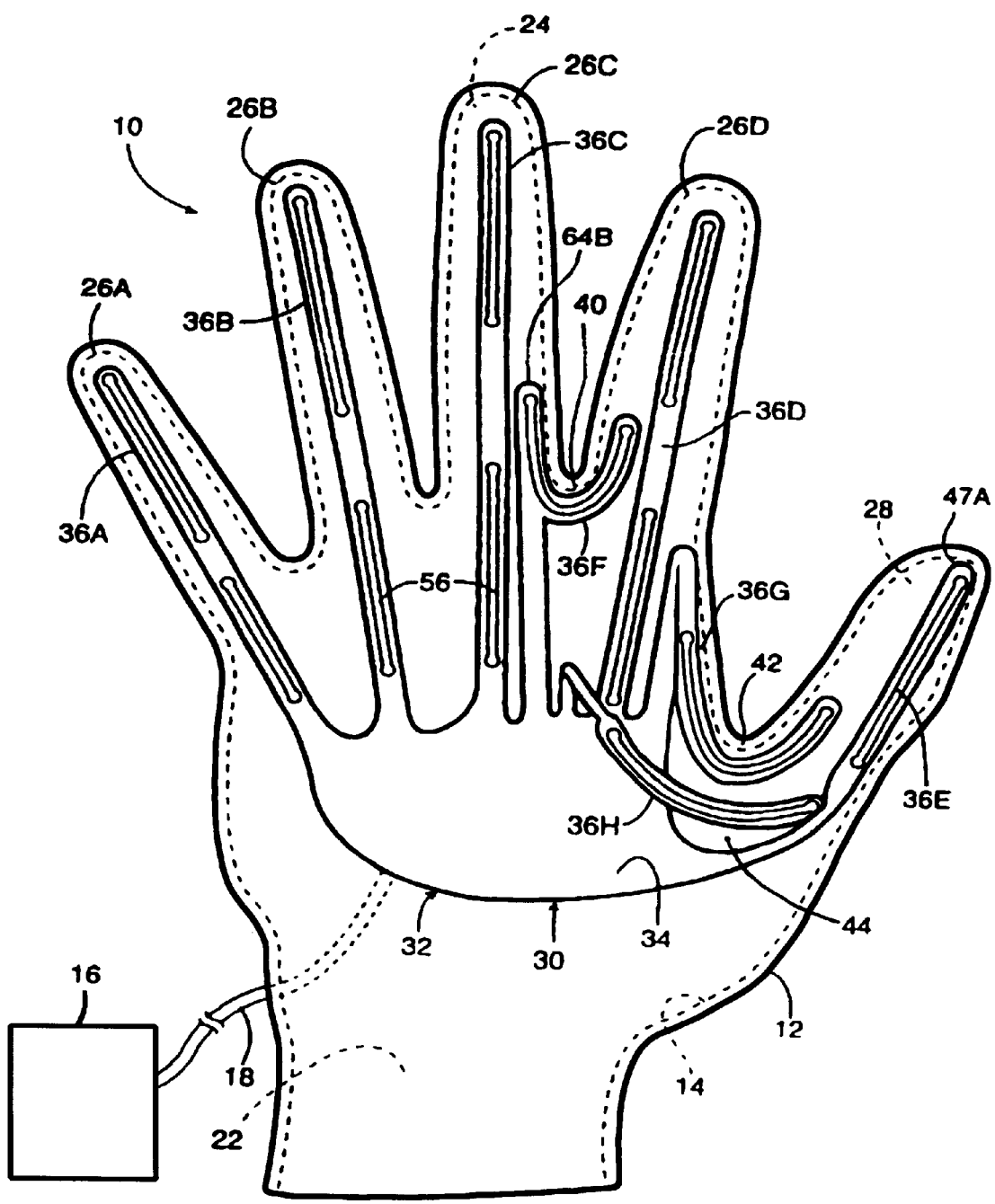
FIG. 1 is a plan view of a preferred embodiment of a data management device for manipulating objects in a computer generated animation in real time, shown partiality in cross-section.
Figure 2:
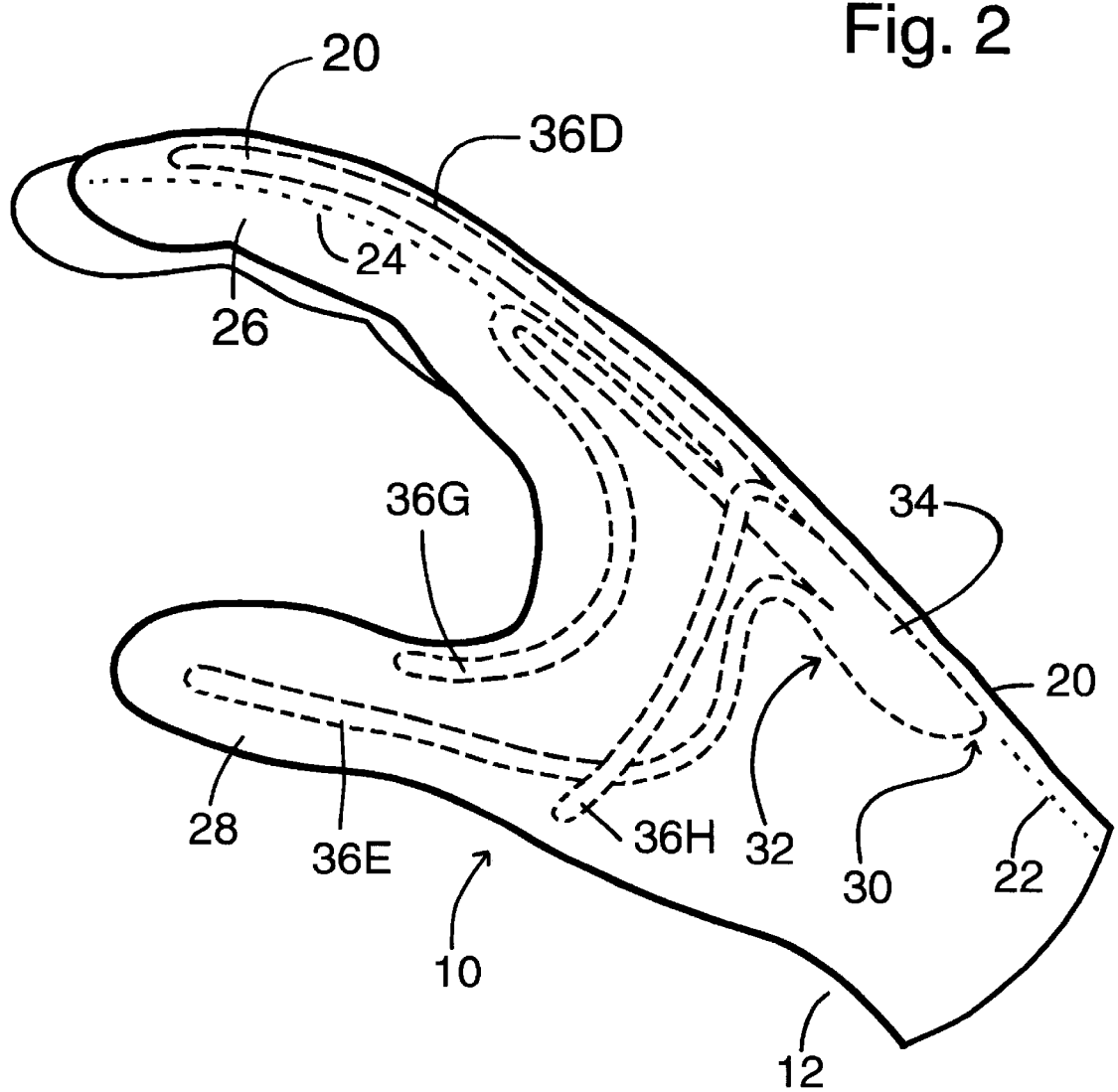
FIG. 2 is a side elevational, cross-sectional view of the preferred embodiment of the invented data management device.

Referring now to FIG. 1 and FIG. 2 of the drawings, there is shown, generally at 10, a preferred embodiment of a system for manipulating a computer generated animation in real time which is constructed according to the principles of the present invention. The preferred embodiment includes a data glove 10 having a glove portion 12 configured to be worn on a wearer's hand 14, a computer 16 for processing data control signals generated by the data glove 10, and a data cable 18 coupling the data glove 10 to the computer 16 for data transfer therebetween. Data generated from the processed control signals is transmitted to the computer 16 for processing in real time. The data is continuously processed so that an object in a virtual reality program, or other appropriate program or application which is running on the computer 10 is manipulated in real time while the program is running.

The glove portion 12 of the data glove 10 of the preferred embodiment of the present invention is constructed from an elastic material closely matching the shape of the wearer's hand 14, while enabling the wearer to move their hand 14 freely. Additionally, the elastic material is preferably breathable which is comfortable for the wearer. The glove portion 12 is configured with an aperture 20 that extends over a dorsal region 22 of the wearer's hand 14 and along a dorsal region 24 of each of their fingers 26 and thumb 28. Suitable textiles for fabricating the glove portion 12 include spandex and super-spandex.

Referring now to FIGS. 1–4, a movement sensing unit 30 is provided for sensing any movements of the wearer's hand 14, such as any movement of the fingers 26, thumb 28, or hand 14 itself. The sensing unit 30 is preferably retained in the aperture 20 of the glove 12, for sensing any hand gestures of the wearer. Securing the sensing unit 30 within the aperture 20 prevents the unit 30 from contacting the hand 14 and from being positioned externally on the data glove 10 which can substantially limit the wearer's freedom of movement and may expose the unit 30 to damage.

In the preferred embodiment of the present invention 10, the sensing unit 30 comprises a flexible circuit board 32 that is configured to extend along the dorsal region 24 of the wearer's fingers 26, thumb 28 and hand 14. The circuit board 32 includes a base region 34 and a plurality of movement sensor electrodes 36. The base region 34 is provided with signal processing means 38 for processing received signals generated by the sensors 36. The processing means 38 may comprise commercially available integrated circuit semiconductor devices such as multiplexers and demultiplexers for processing the signals generated by the sensors 36, and generating data indicative of the movements of the sensors 36; i.e., the hand gestures of the wearer. Once the signals are processed, the data is transmitted to the computer 16 via the data cable 18 for manipulating the program running on the computer 16.

The movement sensors 36 include a plurality of elongated portions of the flexible circuit board 32 that extend outwardly from the base region 34. In the preferred embodiment of the present invention 10, a sensor 36 is provided for sensing movement in each of the wearer's fingers 26 and thumb 28, with additional sensors provided for sensing additional regions of the wearer's hand 14. Preferably, a first sensor 36A is provided to sense movements of the little finger 26A, a second sensor 36B senses the ring finger 26B, a third sensor 36C senses the middle finger 26C, a fourth sensor 36D senses movement of the index finger 26D, and a fifth sensor 36E is provided to sense the thumb 28.

Additionally, an adduction and abduction sensor 36F may be provided for sensing movement in a web area 40 between the index finger 26D and middle finger 26C, and a thumb extension sensor 36G provided for sensing a web area 42 between the wearer's index finger 26D and thumb 28. If desired, a further sensor 36H, referred to as a thumb roll sensor, may be provided for sensing movement of a dorsal region 44 of the hand 14 that extends generally between the base of the index finger 26D to the base of the thumb 28.

Each of the fingers 26, thumb 28, and hand regions 40, 42, 44 are simultaneously monitored for determining any movement of the wearer's hand 14. Any movement of the fingers 26, thumb 28, or hand 14, causes some degree of flexure of one or more of the sensors 36, causing the appropriate sensors 36 to transmit signals to the processing means 38 for transmitting representative data to the computer 16. Thus, any movement of the hand 14, indicating hand gestures thereby, is transmitted to the computer 16 in real time for manipulating a program running on the computer 16 such as manipulating an object in a virtual reality program running on the computer.

Figure 3:
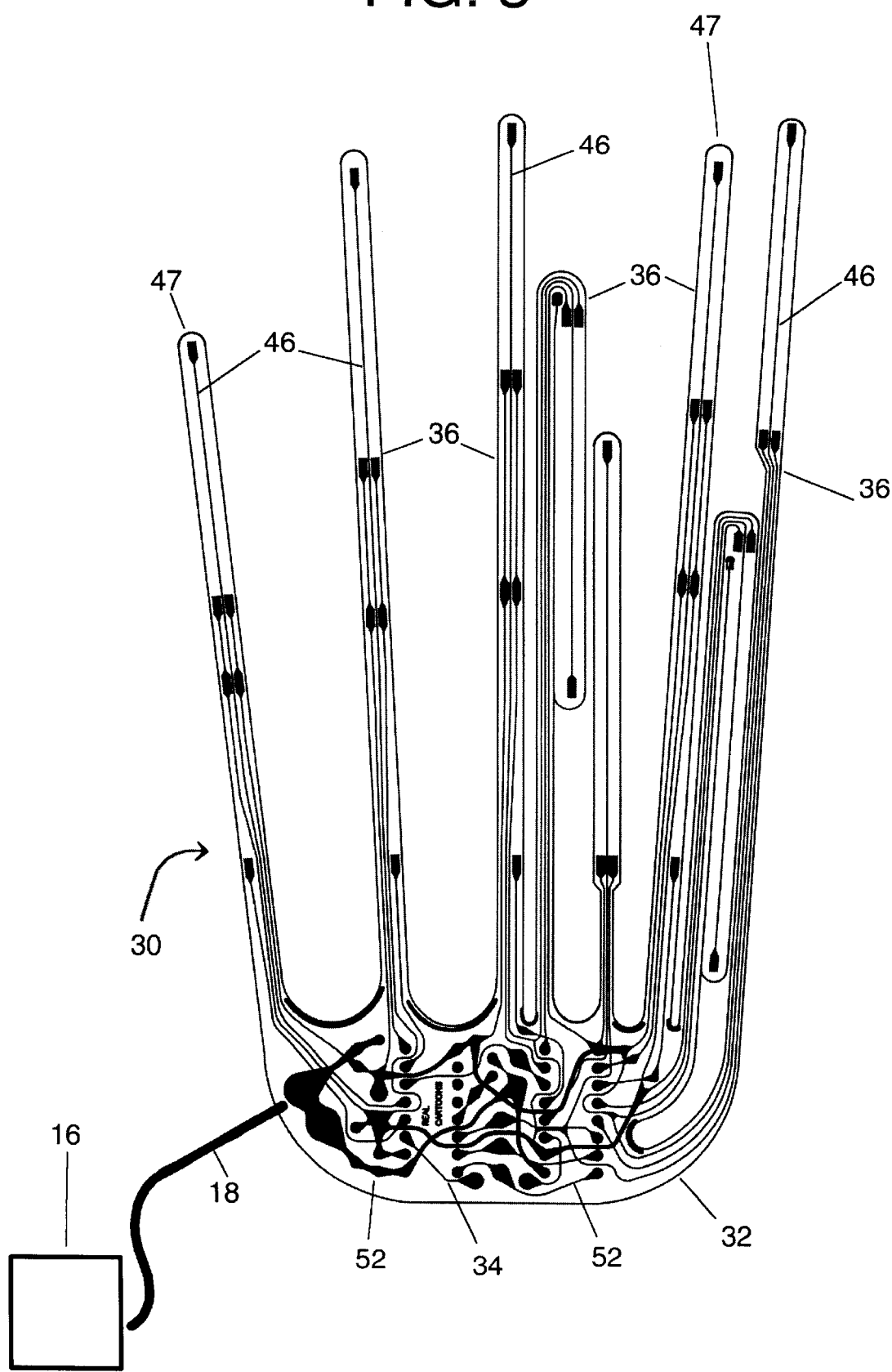
FIG. 3 is a plan view of a flexible circuit board of the preferred embodiment.
Figure 4:
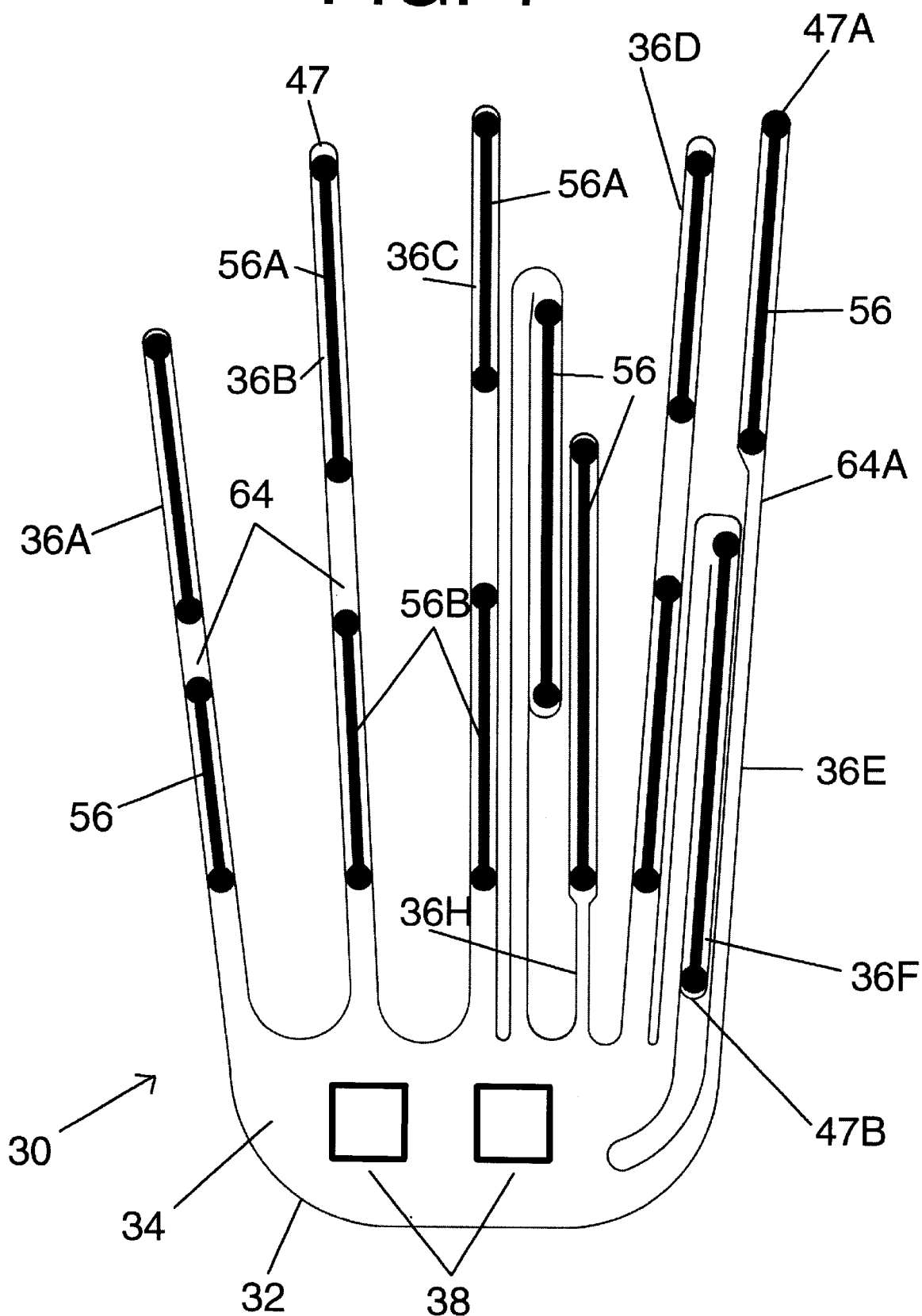
FIG. 4 is a plan view of the flexible circuit board of the preferred embodiment showing locations of sensor electrodes thereon.
Figure 5:
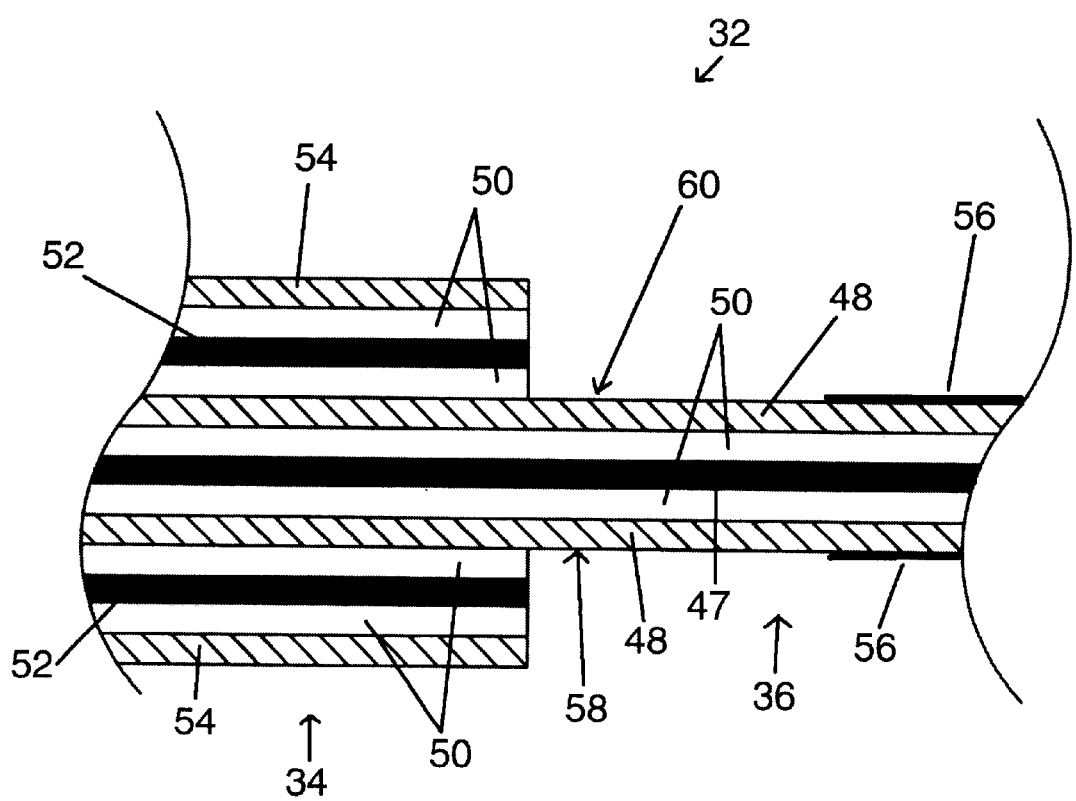
FIG. 5 is a cross-sectional view showing the flexible circuit board of the preferred embodiment.

Referring to FIGS. 3–5, the flexible circuit board 32 comprising the sensing unit 30 is constructed in a known laminar configuration. Preferably, electronic sensor conductors 46 comprise an innermost lamina of the circuit board 32. The sensor conductors 46 extend from a distal end 47 of each of the sensors 36 to the base region 34 and couple the sensors 36 to the processing means 38 for transmitting signals generated by flexure thereof. The conductors 46 is are preferably centered along the length of each of the sensors 36 for balancing the conductor 46. Balancing the conductor 46 along the length of the sensors 36 substantially increases the number of flexures that the conductors 46 can endure without causing harm thereto.

Additionally, the conductors 46 of the preferred embodiment comprise a ductile material, preferably copper, that may be flexed repeatedly without damaging the conductor 46. The copper conductors 46 extending along the sensors 36 preferably comprise one ounce copper wherein there is one ounce of copper disposed on one square toot of circuit board, as is known in the art.

The sensor conductors 46 are interposed between a pair of sensor insulating lamina 48. The insulating lamina 48 preferably comprises a suitable flexible insulating material, such as kapton for example, for enabling repeated flexure of the sensors 36.

A suitable adhesive 50, such as a pliant epoxy adhesive, is interposed between the insulating lamina 48 and sensor conductor 46 for bonding the conductor 46 to the insulating lamina 48. In the preferred embodiment, each insulating lamina 48 is approximately 0.003 inch thick for providing a sensor electrode 36 that is at least approximately 0.010 inch thick. The preferred minimum thickness of the sensors 36 provides a sensor 36 that is sufficiently pliant so that the sensors 36 do not restrict movement of the hand 14, while being sufficiently robust to withstand continued flexure thereof. A single conductor 46 interposed between a pair of insulators 48 in the laminar construction of the sensors 36, provides enhanced longevity and reliability of the invented movement sensing unit 30.

The base region 34 is formed on the lamina 46, 48 comprising the sensors 36 and further includes a plurality of signal conductors 52 for coupling the sensor conductors 46 to the processing means 38. The conductors 52 are located adjacent to the insulating lamina 48 of the sensors 36 and comprise ½ ounce copper, for example.

An outermost insulating lamina 54 is provided over the conductors 52 for mounting the processing means 38 on the base region 34. The outermost lamina 54 comprises a suitable flexible material, such as kapton, and is preferably approximately 0.001 inch thick. A pliant adhesive 50, such as epoxy is disposed between each lamina 52, 54 comprising the base region 34 for bonding the base region 34 together and for bonding the base 34 to the sensors 36, to provide a unitary movement sensing unit 30.

Referring now to FIG. 1 and FIGS. 4–5 of the drawings, a layer of a suitable variable resistive material 56 is disposed over a portion of each outer insulating lamina 48 of the sensors 36, such that an abduction side 58 and an adduction side 60 of each sensor 36 each have substantially identically configured layers of the resistive material 56 thereon. In the preferred embodiment 10, the resistive material 56 is disposed on the finger sensors 36A–36D, such that a distal layer of the material 56A extends from the distal end 47 of each sensor to a selected mid-region 64 thereof. A proximal layer of the material 56B extends from the mid-region 64 toward the base 34.

Each side of the thumb sensor 36E is provided with a layer of resistive material 56 that extends from the distal end 47A of the sensor 36E toward a mid-region 64A thereof. The extension and flexion sensor 36F is provided with a layer of resistive material 56 that extends from a distal end 47B thereof to a mid-region 64B of the sensor 36F, while the thumb roll sensor 36H is provided with a layer of material 56 that extends substantially the length thereof.

The resistive material 56 preferably comprises a suitable graphite based paint, with each layer thereof having a preferred thickness of approximately 0.0005 inch. Each side 58, 60 of the sensors 36 are provided with resistive material 56 of substantially identical configuration, length and thickness, so that the resistive material 56 disposed on each side 58, 60 of the sensor 36 will have a similar initial resistance value. While, the initial resistance value of the material 56 on each side of the sensors 36 may comprise any value desired, preferably the initial resistance value of the material 56 is approximately 2 thousand ohms (2k ohms).

Due to the characteristics of the graphite material 56, any flexure of the sensor 36 causes the resistance value of the material 56 thereof to change in a diverging manner, and most preferably, in a linear fashion. For example, during sensor abduction, wherein the user bends one or more of their fingers 26, or thumb 28, toward the palm of the hand 14, the material 56 on each side 58, 60 undergoes flexure, causing the initial resistance values thereof to diverge. Preferably, during abduction, the resistance value of the material 56 on the adduction side 60 increases, while the resistance value of the material 56 on the abduction side 58 decreases. The resistance values of the material 56 on each side 58, 60 of the sensor 60 diverge to a value corresponding to the degree of flexure of the sensor 36.

The resistive material 56 provides a means for tracking flexure, by providing a differential measurement source. The material 56 on each side 58, 60 of the sensor 36 does not have to have similar initial resistance values, so long as the initial resistance values thereof are known. Additionally, the resistance value of the material 56 need only diverge to provide a measurement, so that it is not important as to which layer of material 56, abduction 58 or adduction 60, increases or decreases in resistance value.

Referring again to the drawing Figures, voltage that is applied to the sensing unit 30 for energizing the processing means 38, for example, is additionally applied to each side 58, 60 of each sensor 36, via the conductors 46 to establish a reference voltage. For example, a negative voltage, such as −5 V may be applied to one side, such as the abduction side 58, of the sensor 36 and a corresponding positive voltage, such as +5 V may be applied to the other side, such as the adduction side 60, for establishing a voltage differential, of approximately 10 V, between the two sides 58, 60, for establishing a voltage divider.

With a positive voltage applied to one side of the sensor 36 and a corresponding negative voltage applied to the remaining side, the sensor 36 is maintained at a 0 V initial voltage potential, when the sensor 36 is substantially planar, prior to any flexure thereof. Flexure of the sensor 36 causes the resistance value of the material 56 on each side thereof to change, for changing the reference voltage level between the abduction and adduction sides 58, 60, such as by the voltage level going more positive or more negative, to indicate that the sensor 36 has been flexed and the degree of flexure.

Referring to the previous example, a desired degree of flexure of a sensor 36, due to abduction of a finger 26, causes the resistance value of the material 56 on the abduction side 5S to decrease, thus increasing the voltage level thereon a corresponding amount, to −5.2 V for example, while the resistance value of the material 56 on the adduction side 60 increases, thus decreasing the voltage level thereon a corresponding amount, to −4.8 V, for example. Thus, flexure of the sensor 36 results in the voltage potential thereon changing from 0 V to −0.2 V Signals representative of the change of voltage potential are transmitted to the processing means 38, which processes the signals for transmitting representative data to the computer 16, via the data cable 18. As the sensors 36 are flexed, the voltage potential thereon constantly changes to indicate the degree of flexure and position of the sensor 36 relative to the initial position thereof.

Thus, the varying voltage potential on each of the sensors 36 provides a facile means for measuring the extent that the sensors 36 are flexed and for determining the various positions of each of the sensors 36. Further, if the degree of flexure of any one of the sensors is maintained, the resistance values remain constant, so that the voltage potential thereon remains constant and indicates that the position of the sensor 36 has not changed. Therefore, the movement sensors 36 of the data glove 10 continuously generate data representative of the actual positions and gestures of the wearer's hand 10, for allowing the processing means 38 to transmit data representative of the wearer's hand gestures to the computer 16.

Thus, there has been described a system for manipulating a computer generated animation in real time, such as a virtual reality program running on a computer. The system includes a data glove for managing data based on an operator's hand gestures. The data glove includes a movement sensing unit that comprises a flexible circuit board that extends along the dorsal region of the wearer's fingers and hand, and includes a plurality of movement sensors. The sensors transmit signals to a processor for determining any movement of the wearer's hand. The sensors have a resistive material disposed on each side thereof, so that any flexure of the sensor causes the resistance values to diverge, preferably linearly. The resistance values on each side of the sensor diverge to a value corresponding to the degree of flexure of the sensor. A reference voltage is applied to each side of the sensor for establishing a voltage differential between the two sides. Any flexure of the sensor causes the resistance value of each side to change, and thereby changes the reference voltage level between the two sides to indicate that the sensor has been flexed and the degree of flexure.

Those skilled in the art will appreciate that various adaptations and modifications of the just-described preferred embodiments can be configured without departing from the scope and spirit of the invention Therefore, it is to be understood that, within the scope of the appended claims, the invention may be practiced other than as specifically described herein.

What is claimed is:

1. A device for measuring flexure comprising:

a printed flexible circuit board having a base region and a plurality of sensor electrodes extending outwardly therefrom, each of the sensors having a first side and a second side;

a layer of resistive material applied to each side of each of the sensor electrodes without mechanical connections, the resistive material applied to each side of the electrode, such that each side thereof has a similar resistance value when the sensor is in an initial position, the layer of resistive material applied to each side of each sensor without mechanical connections comprising a variable resistance material that increases and decreases in value linearly in response to flexures thereof, such that each layer of resistive material has a similar resistance value when the sensor is in an initial position, the resistance material adapted to diverge in a linear manner upon any flexure of the sensor for shifting the voltage potential on the electrode linearly to indicate flexure of the electrode and degree of flexure relative to the initial position thereof, each layer of resistive material comprising a graphite-based paint ranging in thickness from approximately 0.00025 inch to approximately 0.0010 inch;

a power source for applying a different voltage level to each side of each sensor for establishing a voltage differential between the two sides and an initial voltage potential on each sensor, said circuit board, said sensor electrodes and said resistive material forming an integral unit;

wherein any flexure of any sensor causes the resistance value on each side thereof to change, for shifting the initial voltage potential on the sensor to indicate that the sensor has been flexed and the degree of flexure.

2. The device of claim 1 further comprising:

signal processing means for processing signals generated by the sensor electrodes; the sensor being of unitary construction and said processing means being proximally located in relation to said sensor electrodes;

flexible conductor means for coupling the electrodes to the processing means, the conductor means comprising a pliable material for repeatedly flexing the conductor means without causing harm thereto; and means for transmitting processed signals from the signal processing means to a computing means.

3. The device of claim 2 wherein the sensor electrodes comprise elongated portions of flexible circuit board, the flexible printed circuit board comprising a first layer and a second layer of a flexible insulating material with the flexible conductor means interposed therebetween, the conductor means comprising a layer of copper having a selected thickness enabling the copper to be repeatedly flexed.

4. The device of claim 3 wherein the copper conductor of each of the sensor electrodes is centered along its length in relation to the first and second layer of insulating means for balancing the copper to reduce strain thereon enabling the copper to be repeatedly flexed.

5. The device of claim 4 wherein the electrode sensors are approximately 0.010 inch thick.

6. The device of claim 4 wherein the electrode sensors are at least 0.010 inch thick.

7. The device of claim 3 wherein the conductor means comprises a layer of copper having a selected thickness for enabling the copper to be repeatedly flexed, the copper conductor of each of the sensors being perfectly centered along the length of the sensor for balancing the copper to reduce strain thereon enabling the copper to be repeatedly flexed.

* * * * *